Oct. 22, 1929.  G. S. KECK  1,732,474
DIRIGIBLE HEADLIGHT MECHANISM
Filed Nov. 7, 1927
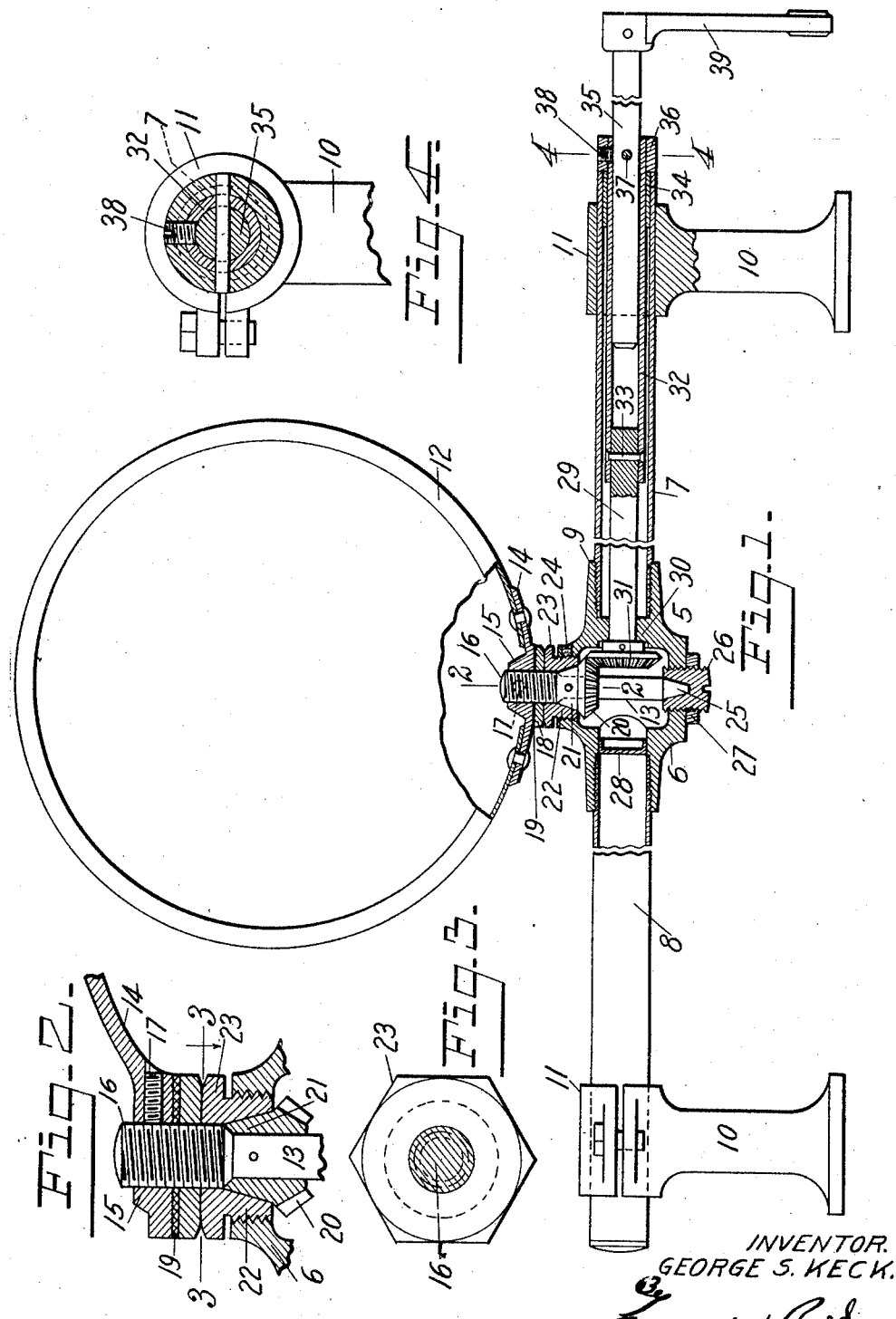
INVENTOR.
GEORGE S. KECK.
ATTORNEY.

Patented Oct. 22, 1929

1,732,474

UNITED STATES PATENT OFFICE

GEORGE S. KECK, OF PASADENA, CALIFORNIA, ASSIGNOR TO THE INTERNATIONAL CONTROLLED LAMP COMPANY, OF LOS ANGELES, CALIFORNIA, A CORPORATION OF DELAWARE

DIRIGIBLE-HEADLIGHT MECHANISM

Application filed November 7, 1927. Serial No. 231,629.

This invention relates to dirigible headlight mechanism and more particularly to a mechanism adapted to be mounted upon automobiles of different sizes. The present device is intended to be manufactured and sold as a unit or accessory which may be installed upon an automobile. Automobiles of different makes are of different sizes and the steering mechanisms, from which the dirigible headlights are actuated, are differently arranged. Consequently a headlight unit of fixed dimensions can be mounted only on automobiles of the size and type for which it is designed. Thus it would be necessary for the manufacturer to provide units of a relatively large number of dimensions, thereby increasing the production costs, and it would also be necessary for the dealer to carry a large stock of headlight units of different dimensions in order to meet all demands.

One object of the invention is to provide supporting and actuating means for a dirigible headlight of such a character that it may be installed upon automobiles of various makes.

A further object of the invention is to provide such a mechanism which will be simple in its construction, of a strong durable character, and in which the parts may be so arranged and connected one to the other that they will not become loose and rattle because of wear.

A further object of the invention is to provide such a supporting structure with means for maintaining at all times a snug bearing contact between the lamp spindle and its bearing.

A further object of the invention is to provide improved means for connecting the lamp spindle with the lamp casing.

Other objects of the invention will appear as the apparatus is described in detail.

In the accompanying drawings Fig. 1 is a front elevation, partly in section, of a headlight unit embodying my invention; Fig. 2 is a sectional view taken on the line 2—2 of Fig. 1; Fig. 3 is a section taken on the line 3—3 of Fig. 2; and Fig. 4 is a section taken on the line 4—4 of Fig. 1.

In these drawings I have illustrated one embodiment of my invention and have shown the same as designed for use in connection with a single headlight but it will be understood that the apparatus may take various forms and may be utilized with one or a plurality of lamps, without departing from the spirit of the invention.

In that embodiment of the invention here illustrated the supporting structure as a whole is indicated by the reference numeral 5. It comprises a central housing 6 to which is rigidly secured a laterally extending member 7 which is preferably tubular in form and is adapted to be mounted on the frame of an automobile. In the present instance, the supporting structure is preferably mounted on both frame members of the automobile and I have therefore shown a second laterally extending member 8 secured to the housing 6 and adapted to be mounted on the other frame member. The laterally extending members 7 and 8 may be secured to the housing in various ways but I prefer to provide the housing with laterally extending hollow bosses 9 into which the inner ends of the two members, 7 and 8, are screw threaded. The laterally extending members of the supporting structure may be mounted on the frame members in any suitable manner and, as here shown, they are mounted in the upper ends of standards 10 adapted to be secured to the respective frame members and, as here shown, provided with transverse openings to receive the respective members of the supporting structure. The lateral members of the supporting structure may extend through the openings in the standards varying distances, thus permitting a supporting structure of fixed length to be mounted on any automobile the frame members of which are spaced apart a distance not greater than the length of the supporting structure. Preferably the upper portions of the standards are in the form of split sleeves 11 which may be clamped tightly about the members of the supporting structure in any position which the latter may occupy with relation to the standards.

The headlight proper, or lamp, 12 is carried by a spindle 13 which is journaled in vertical bearings in the housing 6. The spindle may be secured to the lamp casing in any suitable manner but, as here shown, I have provided a connecting member 14 adapted to fit about and be rigidly secured to the lower portion of the lamp casing. This connecting member has a thickened portion, or upwardly extending boss, 15 extending into the lamp casing through an opening in the wall thereof and this thickened portion has a screw threaded opening to receive the screw threaded upper end 16 of the spindle 13. A set screw 17 extends through the thickened portion or boss 15 of the connecting member and engages the screw threaded portion of the spindle so as to hold the lamp in adjusted positions with relation to the spindle. If desired, a locking nut 18 may be threaded onto the part 16 of the spindle below the connecting member and screwed into firm engagement with the connecting member to lock the same against movement, a washer 19 being interposed between the locking nut and the connecting member, if desired.

The spindle is journaled in suitable bearings in the upper and lower portions of the housing 6 and these bearings are preferably adjustable to compensate for wear and maintain a proper bearing contact between the same and the bearing portions of the spindle. In the present instance, the spindle has rigidly secured thereto within the housing a gear 20, for connecting the same with actuating mechanism, as will hereinafter appear. This gear has an elongated tapered hub 21 which constitutes a bearing portion or trunnion for the spindle and is seated in a tapered bearing opening in a part of the housing. Preferably the bearing opening for the hub 21 is formed in a cap or nut 22 which is screw threaded into the upper portion of the housing and has its outer portion 23 shaped to receive a wrench or other implement for rotating the same. Thus the bearing may be adjusted with relation to the bearing portion or journal 21 of the spindle and it may be held in its adjusted position in any suitable manner, as by means of a set screw 24. The lower end of the spindle is tapered, as shown at 25, and is seated in a tapered recess in a plug or bearing member 26 which is screw threaded into the lower wall of the housing and is thus adjustable to maintain proper bearing contact between the same and the spindle. A locking nut 27 on the outer portion of the bearing member 26 serves to retain the same in its adjusted position. If desired, the housing may contain a lubricant and when the laterally extending member 8 of the supporting structure is tubular in form a suitable plug may be inserted in the boss 9 for that member, as shown at 28, to prevent the escape of the lubricant.

An actuating device for imparting rotatory movement to the headlight is mounted on the tubular member 7 of the supporting structure and preferably comprises two parts which are longitudinally adjustable with relation one to the other and may be rigidly connected one to the other in their adjusted positions, thus enabling the length of the actuating device to be adjusted to accommodate it to automobiles of different makes. As here shown, this actuating device comprises an inner portion or shaft 29 journaled in a bearing 30 in the housing 6. The inner end of this shaft 29 extends into the housing and has secured thereto a gear 31 which meshes with the gear 20 on the spindle. The hub of the gear 31 bears against the inner face of the bearing 30 and thus holds the shaft against outward movement. The actuating device further comprises a tubular portion 32 which is rigid with the shaft 29. In the present instance, this tubular portion is separate from the shaft 29 and is mounted thereon and rigidly secured thereto, as by means of a rivet 33. The tubular portion 32 of the actuating device is journaled in a bearing 34 within the tubular member 7 of the supporting structure, this bearing preferably having its outer end flush with the outer end of said tubular member. The tubular portion 32 of the actuating device also extends beyond the bearing 34 and the tubular member 7 for a relatively short distance. Slidably mounted in the tubular portion 32 of the actuating device is an adjustable portion or outer shaft 35 of the actuating device which may be adjusted to any desired position with relation to the tubular portion 32 and then rigidly secured thereto in order to impart to the actuating device a length suitable to the particular automobile on which the apparatus is being installed. Preferably a collar 36 is mounted on that portion of the tubular member 32 which extends beyond the supporting structure and bears against the end of the supporting member and the bearing 34 to hold the tubular member 32 against lengthwise movement in an inward direction, that member being held against outward movement by the hub of the gear 31. The outer shaft 35 of the actuating device may be secured to the tubular member 32 thereof in any suitable manner, as by inserting a pin 37 through the two parts. In the present instance, this pin also extends through the collar 36 so that the three parts are rigidly connected one to the other. It is not practical to provide the outer shaft 35 with an opening for the pin 37 prior to installation, because the position of that opening will vary in different installations. To facilitate the drilling of the hole for the pin 37 in the desired position during the installation of the apparatus I provide means for temporarily securing the collar 36, the tubular member 32 and the outer shaft 35 one to the other and holding them in their adjusted positions during the drilling of the hole, this means preferably comprising a set screw 38 screw threaded into the collar 36 and extending through the tubular member 32 into engagement with the shaft 35. In the installation of the apparatus the shaft is adjusted to its desired position and locked in that position by the set screw 38 and the hole 37 then drilled. The pin holes through the collar 36 and tubular member 32 may be formed prior to installation as they will always occupy the same positions and it would then only be necessary to drill the hole through the shaft and insert the pin 37. When this pin is driven into place the several parts will be very rigidly connected one to the other and a strong driving connection provided between the shaft 35 and the tubular part 32 of the actuating device. The shaft 35 may be connected with operating mechanism, such as the steering mechanism of the automobile, in any suitable manner, as by means of a crank arm 39.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus of the character described, a supporting structure for a headlight comprising a transverse member having between its ends means for rotatably supporting a headlight thereon and having that part thereof on one side of said headlight supporting means tubular in form, an actuating device rotatably mounted in the tubular part of said transverse member and comprising telescoping parts, one of which has at its inner end means for operatively connecting the same with said headlight, the other of said parts extending beyond the outer end of said tubular part of said transverse member, means for rigidly connecting one of said telescoping parts to the other in an adjusted position, and means for connecting that part of said actuating device which extends beyond the outer end of said tubular part of said transverse member with operating mechanism.

2. In an apparatus of the character described comprising a supporting structure for a headlight having a tubular member, an actuating device rotatably mounted in said tubular member and comprising two parts one of which is held against longitudinal movement and extends beyond the outer end of said tubular member, and the other of which extends lengthwise of and is slidably mounted on the first mentioned part and extends beyond the outer end thereof, and means for rigidly securing the last mentioned part to the first mentioned part in an adjusted position with relation thereto.

3. In an apparatus of the character described comprising a supporting structure for a headlight having a tubular member, an actuating device comprising a tubular part rotatably mounted in said tubular member and extending beyond the end thereof, and a second part slidably mounted in said tubular part and extending beyond the end thereof, and means mounted beyond the end of said tubular member for rigidly securing the last mentioned part to said tubular part in an adjusted position with relation thereto.

4. In an apparatus of the character described comprising a supporting structure for a headlight having a tubular member, an actuating device comprising a tubular part rotatably mounted in said tubular member and extending beyond the end thereof, and a second part slidably mounted in said tubular part and extending beyond the end thereof, means for temporarily securing the last mentioned part to the first mentioned part in an adjusted position with relation thereto, and other means for permanently connecting said parts while they are held by said temporary securing means.

5. In an apparatus of the character described comprising a supporting structure for a headlight having a tubular member, an actuating device comprising a tubular part rotatably mounted in the tubular member of said structure and extending beyond the end thereof, a collar secured to the projecting end of said tubular part and engaging the adjacent end of the tubular member of said structure, a shaft slidably mounted in the tubular part of said actuating device, and means for rigidly securing said shaft to said tubular part in adjusted positions with relation thereto.

6. In an apparatus of the character described comprising a supporting structure for a headlight having a tubular member and having bearings at the respective ends of said tubular member, an actuating device comprising a part journaled in said bearings and having a tubular portion which extends beyond the outer end of said tubular member, a collar secured to the projecting end of said tubular portion of said actuating device and engaging the adjacent end of said tubular member, a shaft slidably mounted in said tubular portion of said actuating device, and means for rigidly securing said shaft to the projecting portion of said tubular portion of said actuating device in a longitudinally adjusted position with relation thereto.

7. In an apparatus of the character described, comprising a supporting structure for a headlight having a tubular member and having bearings at the respective ends of said tubular member, a shaft journaled in the bearing at the inner end of said tubular member, a tubular shaft rigidly secured to the outer end of said first mentioned shaft, journaled in the bearing at the outer end of said tubular member and extending beyond said end of said tubular member, a shaft mounted in said tubular shaft for adjustment lengthwise thereof, and means to rigidly secure said adjustable shaft to the projecting end portion of said tubular shaft in an adjusted position with relation thereto.

8. In an apparatus of the character described, a supporting structure comprising a housing and a tubular member secured to said housing, said housing having a bearing at the inner end of said tubular member, a shaft journaled in said bearing and extending into said tubular member, a gear secured to said shaft within said housing to hold the shaft against lengthwise movement in one direction, a tubular shaft secured to the outer end of the first mentioned shaft and journaled in the bearing at the outer end of said tubular member and projecting beyond said tubular member, a shaft mounted in said tubular shaft for adjustment lengthwise thereof and extending beyond the end of said tubular shaft, a collar mounted on the end of said tubular shaft and arranged to engage the end of said tubular member, and means for rigidly securing said collar, said tubular shaft and said adjustable shaft one to the other.

9. In an apparatus of the character described, a supporting structure comprising a housing and a tubular member, an actuating device rotatably mounted in said tubular member and comprising two parts one of which is longitudinally adjustable with relation to the other, means arranged exteriorly of said tubular member for rigidly connecting the two parts of said actuating device one to the other in adjusted positions, a spindle rotatably mounted in said housing, means for operatively connecting said spindle with said actuating device, said housing having bearings for said spindle and said bearings being adjustable to compensate for wear, and a headlight rigidly connected with said spindle.

10. In an apparatus of the character described, comprising a supporting structure having a housing, a bearing mounted in said housing and having an inwardly facing shoulder, a bearing member adjustably mounted in said housing spaced from said bearing and having a bearing recess, a spindle mounted in said bearing, having a part to engage said shoulder, and having one end seated in the tapered recess in said adjustable bearing member, said spindle adapted to have a headlight secured thereto.

11. In an apparatus of the character described comprising a supporting structure for a headlight having a housing, a nut threaded into the upper part of said housing and having a tapered bearing opening, a plug screw threaded into the lower part of said housing and having a tapered bearing recess, a spindle having a tapered lower end seated in said bearing recess and having a tapered bearing portion mounted in the tapered opening of said nut, and means for connecting said spindle with a headlight.

12. In an apparatus of the character described comprising a supporting structure having a housing and a laterally extending tubular member, an extensible actuating device rotatably mounted in said tubular member and extending into said housing, a gear secured to said actuating device within said housing, a bearing at the lower end of said housing, a nut screw threaded into the upper portion of said housing and having a tapered bearing opening, a spindle seated in the first mentioned bearing, a gear rigidly secured to said spindle, meshing with the first mentioned gear and having a tapered hub portion journaled in the opening in said nut, and means for securing said spindle to a headlight.

13. In an apparatus of the character described comprising a supporting structure having a housing and a headlight supported by said housing, an axially adjustable bearing member mounted in the lower part of said housing and having a bearing recess, a nut screw threaded into the upper part of said housing and having a tapered bearing opening, a spindle having an end portion mounted in said recess and having a tapered bearing surface journaled in the bearing opening of said nut, said spindle having a screw threaded portion extending beyond said nut, a connecting member adapted to be rigidly secured to a lamp casing and having a thickened portion provided with a screw threaded opening to receive the threaded end of said spindle, and a lock nut mounted on the threaded portion of said spindle and adapted to lock and said headlight against movement with relation to said spindle.

In testimony whereof, I affix my signature hereto.

GEORGE S. KECK.